No. 612,427. Patented Oct. 18, 1898.
W. D. MARKS.
ELECTRIC METER CASE.
(Application filed Jan. 10, 1898.)
(No Model.)
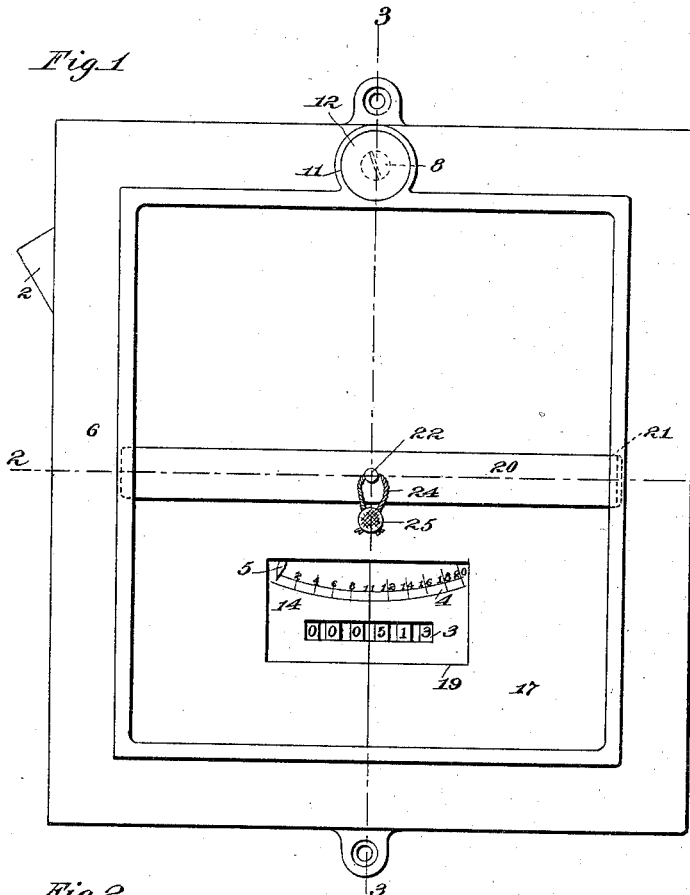
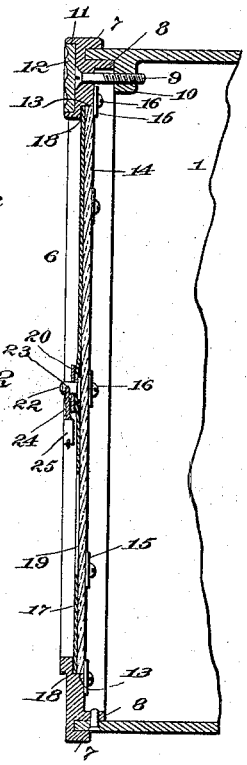
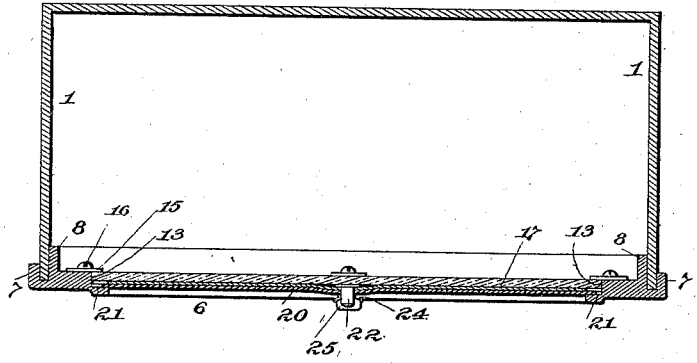
Witnesses:
Jas. F. Coleman
Jno. R. Taylor
Inventor
William D. Marks,
by Rich'd N. Dyer,
Att'y.

UNITED STATES PATENT OFFICE.

WILLIAM D. MARKS, OF PHILADELPHIA, PENNSYLVANIA, ASSIGNOR TO THE AMERICAN ELECTRIC METER COMPANY, OF SAME PLACE.

ELECTRIC-METER CASE.

SPECIFICATION forming part of Letters Patent No. 612,427, dated October 18, 1898.

Application filed January 10, 1898. Serial No. 666,190. (No model.)

*To all whom it may concern:*

Be it known that I, WILLIAM D. MARKS, a citizen of the United States, residing at Philadelphia, in the county of Philadelphia and State of Pennsylvania, have invented a certain new and useful Improvement in Electric-Meter Cases, of which the following is a specification.

My invention relates to improved cases for electric and other meters; and the invention is particularly adapted for use in connection with those meters heretofore invented by me and employing a controlling arch or cam the position of which is adjusted by an ampere-indicator and which acts as a variable limiting-stop for one direction of movement of a pivoted arm for actuating a register, the said arm being moved always to the same extent in the opposite direction by a suitable electric motor, such as an oscillating pendulum. With that meter I employ, in addition to a register for indicating the total consumption of current, an ampere-indicator carried adjacent to said register for indicating the number of amperes passing through the meter at the period of observation.

The objects of my invention are to provide a suitable case for an electric meter or similar device by means of which the operating or registering parts may be protected from dust and dirt and by which also will be prevented any tampering with the register.

A further object of the invention is to provide a suitable cover for such a case by means of which at the time the meter is installed and at periods of inspection the entire mechanism of the meter may be observed, while during the rest of the time the operative parts, but not the register and ampere-indicator, will be concealed from observation. With my present invention, therefore, when employed with an electric meter of the type referred to as an illustration, the operative parts will be normally sealed from outside interference, and access to the same will be had only in the case of accidental derangement of the mechanism. When the meter is installed, the entire operative parts of the mechanism will be observed through a glass panel occupying substantially the entire front of the case, so that the inspector may be assured that the meter is in operative condition. When this inspection has taken place, all of the glass panel referred to, with the exception of that part thereof coincident with the register and ampere-scale, will be covered by a suitable plate and the latter will be effectively sealed in place, being, however, readily removable by the authorized person whenever desired.

In order that my invention may be better understood, attention is directed to the accompanying drawings, forming a part of this specification, and in which—

Figure 1 is a front view of an electric meter of the type referred to, illustrating the general features of novelty of my improved meter-case; Fig. 2, a section on the line 2 2 of Fig. 1, and Fig. 3 a section on the line 3 3 of Fig. 1.

In all of the above views corresponding parts are represented by the same numerals of reference.

1 1 represent the walls of a suitable rectangular casing or box in which the operative parts of the meter are placed. Cast with or separate from the side walls of the casing are lugs 2 2, through which pass the wires connecting the meter with the line. The meter is provided with a suitable register 3 and with a scale 4, with which coöperates a pointer 5 of an ampere-indicator. The register 3 indicates the total consumption of current, while the scale, with its coöperating pointer 5, gives an indication of the number of amperes passing through the meter at any instant.

6 represents a front frame made of a single casting and which is provided with a continuous external flange 7, fitting closely around the walls 1 of the box. The said frame is also provided with an internal and somewhat deeper flange 8, fitting on the inside of the box. The joints between the flanges 7 and 8 and the walls 1 of the box are sufficiently close or so packed as to prevent the entrance of dust and dirt into the interior of the box. Passing through the bottom wall of the box are a plurality of pins, (one being shown in Fig. 3,) which pins engage openings or sockets in the flange 8 and by which the frame 6 will be held in place at its lower end. The said frame is fastened at its upper end to the top wall of the box by a screw or screws 9 passing through said frames and entering a lug 10, riveted to or cast with that wall of the box. The head of the screw 9 is located in a shallow recess 11, formed in the frame 6, and after the said screw has been engaged with the lug 10, so as to hold the frame in place, a suitable seal 12, of wax, lead, or similar material, fills the said recess 11, so as to conceal the head of the screw. The frame 6 is provided on its under side with a seat 13, extending entirely around said frame, and carried upon said seat is a plate of glass 14, held in place by small washers 15 and screws 16 and cement or putty. Before the meter is set up for use the inspector is enabled to observe the entire working parts thereof through the glass plate 14; but after the meter has been installed and started in operation or is in condition to start the glass plate 14 is entirely concealed except at that part thereof coincident with the register 3 and the scale 4. For this purpose I employ a plate 17, made, preferably, of sheet brass or tin and which is carried in recesses 18, formed at the bottom and top of the frame 6, as shown in Fig. 3. To allow for this engagement, the plate 17 is buckled at its center, so as to allow the same to pass within the frame 6. The plate 17 is provided with a rectangular opening 19 therein, through which may be observed the register and the ampere-scale. In order to lock the plate 17 in place, I employ a locking-bar 20, which extends across the front of said plate from side to side, as shown in Figs. 1 and 2. This bar 20 engages recesses 21, formed in the frame 6, at the sides thereof. In order to lock the bar 20 to the plate 17, I provide a suitable sealing device, which in the present instance comprises a rivet 22, secured to the plate 17 and passing through an opening in the bar 20. The shank of the rivet 22 is provided with an opening 23 therein, through which is passed a wire 24, the ends of which are connected together by a small lead seal 25.

When it is desired to examine the mechanism of the meter, the seal 25 is removed, so as to allow the wire 24 to be disengaged from the rivet 22, after which the bar 20 is bowed at its center, so as to spring out from engagement with the recesses 21. This will free the plate 17, which can be removed from engagement with the recesses 18 by being bowed or buckled at its center, as will be understood.

Having now described my invention, what I claim as new, and desire to secure by Letters Patent, is as follows:

1. A casing for electric meters comprising a box, a frame carried upon the front of said box and secured to the lower wall thereof, a screw for connecting the upper part of said frame to the upper wall of said box, and a seal for said screw, substantially as set forth.

2. A casing for electric meters comprising a box, a frame carried upon the front of said box and secured to the lower wall thereof, a screw for connecting the upper part of said frame to the upper wall of said box, a socket in the frame adjacent to said screw, and a seal 12 in said socket, substantially as set forth.

3. An improved casing for electric meters comprising a box, a frame carried by said box, a glass panel in said frame, and a metallic plate fastened in front of said glass panel and having an opening therein, substantially as set forth.

4. An improved casing for electric meters comprising a box, a frame carried by said box, a glass panel in said frame, and a metallic plate removably fastened in front of said glass panel and having an opening therein, substantially as set forth.

5. An improved casing for electric meters comprising a box, a frame carried by the front of said box, a glass panel secured to said frame, a metallic plate carried in front of said glass panel and engaging recesses in said frame, and a locking-bar extending crosswise of said plate for securing the same in place, substantially as set forth.

6. An improved casing for electric meters comprising a rectangular box, a frame carried by the front of said box, a glass panel secured to said frame, a metallic plate engaging recesses in opposite sides of said frame and located in front of said panel, and a locking-bar engaging recesses in the other sides of said frame for holding said plate in place, substantially as set forth.

7. An improved casing for electric meters comprising a rectangular box, a frame carried by the front of said box, a glass panel secured to said frame, a metallic plate engaging recesses in opposite sides of said frame and located in front of said panel, a locking-bar engaging recesses in the other sides of said frame for holding said plate in place, and a sealing device for fastening said locking-bar to said metallic plate, substantially as set forth.

8. An improved casing for electric meters comprising a rectangular box, a frame carried by the front of said box, a glass panel secured to said frame, a metallic plate engaging recesses in opposite sides of said frame and located in front of said panel, a locking-bar engaging recesses in the other sides of said frame for holding said plate in place, a rivet secured to said plate passing through an opening in said locking-bar, and a seal for said rivet, substantially as set forth.

This specification signed and witnessed this 23d day of December, 1897.

WM. D. MARKS.

Witnesses:
STEWART H. WILLIAMS,
JOHN P. MCLAUGHLIN.